United States Patent [19]

Bell

[11] 4,332,313
[45] Jun. 1, 1982

[54] BICYCLE BRAKE

[76] Inventor: Theodore F. Bell, 26 Twin River Dr., Ormond Beach, Fla. 32074

[21] Appl. No.: 172,137

[22] Filed: Jul. 25, 1980

[51] Int. Cl.³ .............................................. B62L 5/10
[52] U.S. Cl. .................................... 192/5; 188/24.17
[58] Field of Search ............... 192/5; 188/24.11, 24.17

[56] References Cited

U.S. PATENT DOCUMENTS

| | | | |
|---|---|---|---|
| 611,073 | 9/1898 | Morrow | 192/5 |
| 675,288 | 5/1901 | Nash | 192/5 |
| 4,254,848 | 3/1981 | Moss | 188/24.11 |

Primary Examiner—George H. Krizmanich
Attorney, Agent, or Firm—Barnes, Kisselle, Raisch & Choate

[57] ABSTRACT

A bicycle brake for a bicycle having a frame with a hub in which pedal cranks are rotatably mounted comprising a disc rotatably mounted on the hub for rotation with the cranks and a brake shoe pivoted to the frame and extending upwardly along the front of the rear tire of the bicycle and having a surface for engaging the tire upon actuation of the brake. The brake includes a ball clutch arm pivoted on the shoe and extending upwardly and forwardly toward the periphery of the disc. The arm has opposed walls between which the periphery of the disc extends and the walls have inwardly facing grooves that taper transversely and longitudinally in a rearward direction. A pair of balls is positioned in each groove between the disc and the respective wall and a spring yieldingly urges the shoe away from the tire such that when the pedal cranks are pedaled rearwardly, the balls travel rearwardly along the grooves to pivot the ball clutch arm and, in turn, the brake shoe bringing the brake shoe surface into frictional contact with the surface of the rear tire.

16 Claims, 8 Drawing Figures

BICYCLE BRAKE

BACKGROUND AND SUMMARY OF THE INVENTION

In bicycles having multi-speed transmissions, it is not possible to utilize a conventional bicycle brake and it is customary to utilize hand-operated brakes engaging the wheels or rims on the front and rear of the bicycles.

It has heretofore been suggested that brakes be incorporated in such bicycles which function upon rearward movement of the pedal cranks. For example, sprag or ratchet type brakes have been shown in U.S. Pat. Nos. 603,310, 868,671, 634,700, 670,473, 4,134,481, 3,486,586, and 3,888,334. Other similar constructions have been suggested in U.S. Pat. Nos. 3,831,716 and 3,858,689.

As far as the applicant is aware, none of these devices has proven satisfactory.

In U.S. Pat. No. 625,415, there is suggested a back pedaling brake which utilizes a ball moving along an incline in a disc rotatable with the pedal cranks to move a floating shoe into contact with the tire. One of the problems with such a device is that the attitude or orientation of the shoe is not controlled, it is very noisy and does not work smoothly or dependably.

Among the objectives of the present invention are to provide a bicycle brake for multi-speed bicycles which will operate quietly, positively and efficiently; which is extremely reliable; which will have long life and not be adversely affected by dirt and foreign material; and which utilizes a minimum number of parts.

In accordance with the invention, the bicycle brake comprises a disc rotatably mounted on the hub for rotation with the pedal cranks, a brake shoe pivoted to the frame and extending upwardly along the front of the rear tire of the bicycle and having a surface for engaging the tire upon actuation of the brake, a ball clutch arm pivoted on the shoe and extending upwardly and forwardly toward the periphery of the disc, and having opposed walls between which the periphery of the disc extends. The walls have inwardly facing grooves that taper transversely and longitudinally in a rearward direction, and a pair of balls is positioned in each groove between the disc and the respective wall. Means yieldingly urge the shoe away from the tire such that when the pedal cranks are pedaled rearwardly, the balls travel rearwardly along the grooves to pivot the ball clutch arm and, in turn, the brake shoe bringing the brake shoe surface into frictional contact with the surface of the rear tire.

DESCRIPTION

Figure 1:
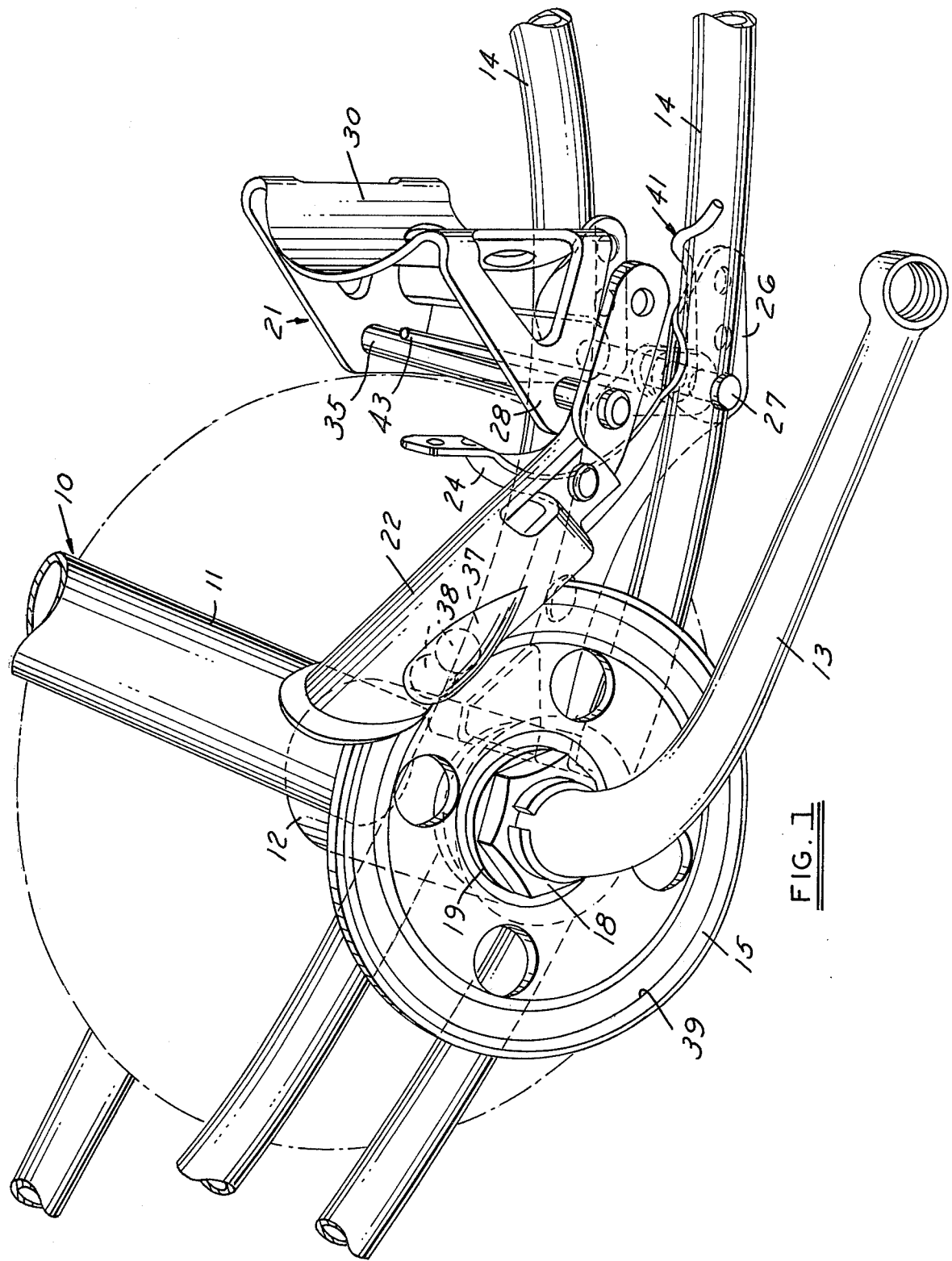
FIG. 1 is a fragmentary perspective view of a bicycle embodying the bicycle brake.
Figure 2:
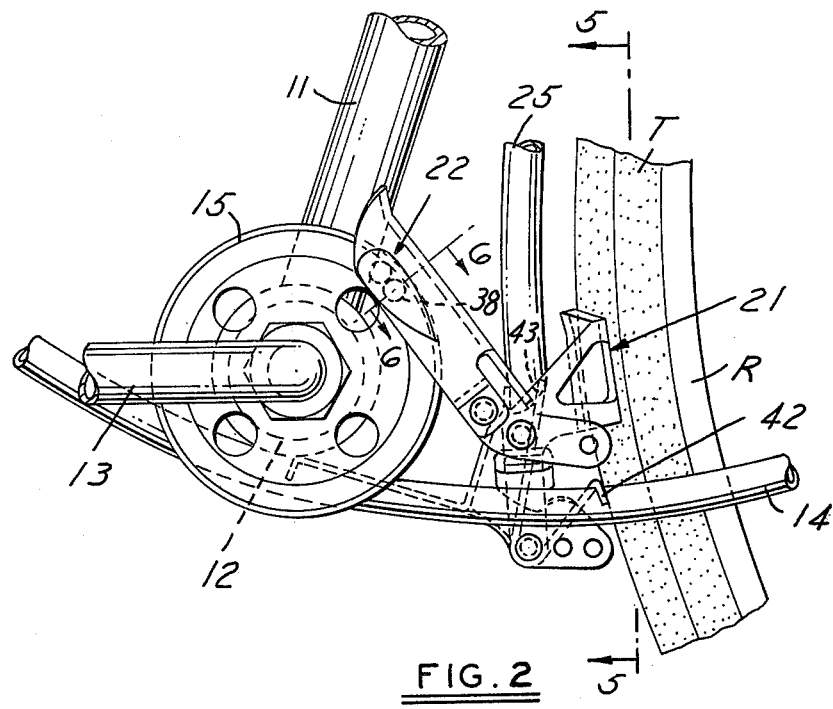
FIG. 2 is a fragmentary side elevational view thereof.
Figure 3:
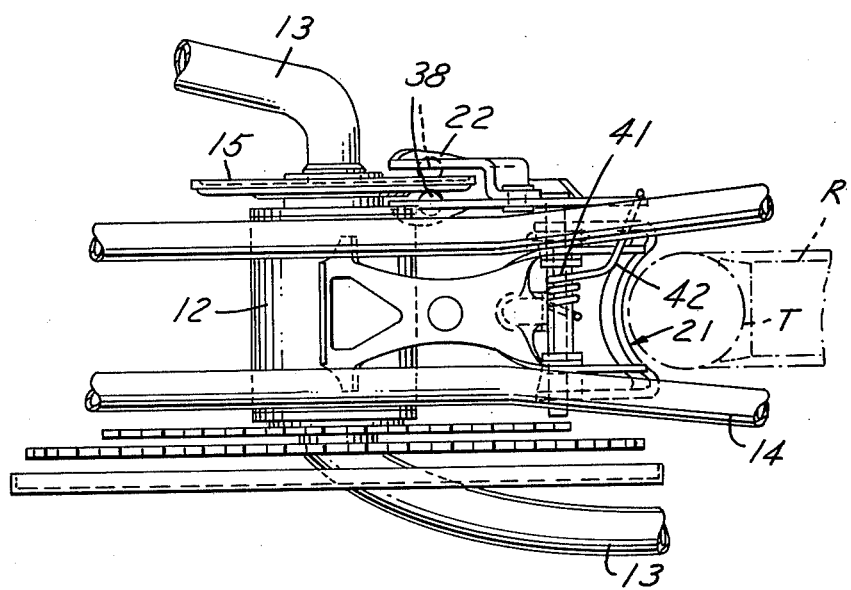
FIG. 3 is a fragmentary bottom plan view thereof.

Referring to FIGS. 1–5, the bicycle brake is utilized with a bicycle frame 10 which may be of conventional structure or of the type shown in my U.S. Pat. No. 4,129,317. In either type of frame, the frame includes a seat post 11, a hub 12 in which a sprocket mechanism and pedal cranks 13 are rotatably mounted, and a pair of frame portions 14 which extend rearwardly and between which the rear wheel R is rotatably mounted.

In accordance with the invention, a disc 15 is mounted for rotation with the pedal cranks 13 as, for example, by a key 16 engaging a keyway 17 in the crank supporting mechanism. A nut 18 and associated washer 19 hold the disc in fixed position for rotation with the cranks (FIG. 4).

A sheet metal crank housing bracket 20 is mounted on the frame portions 14 and a sheet metal brake shoe 21 is pivoted to the bracket 20. In turn, a ball clutch arm 22 is pivoted to the brake shoe 21.

Figure 4:
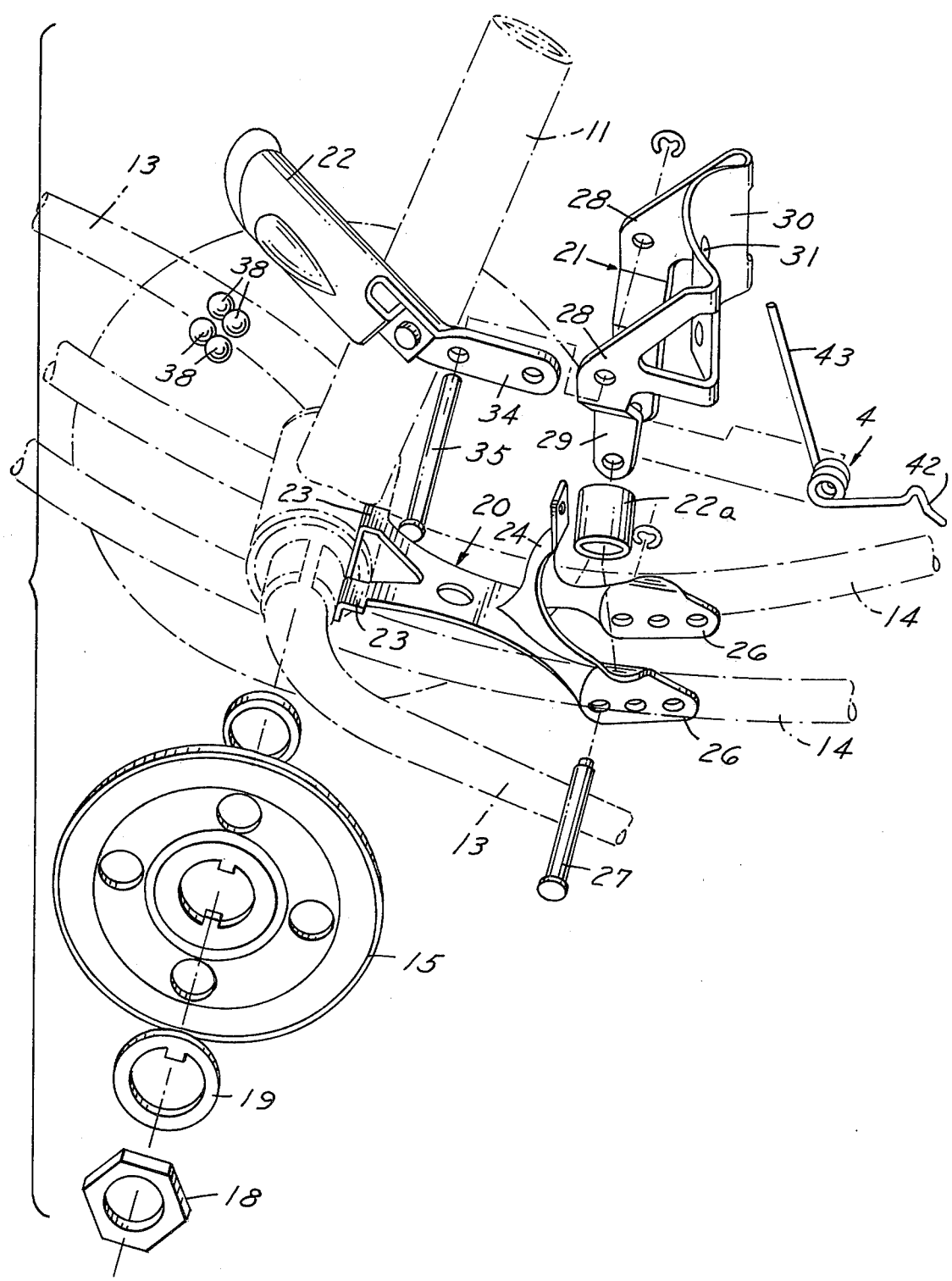
FIG. 4 is an exploded perspective view thereof.
Figure 5:
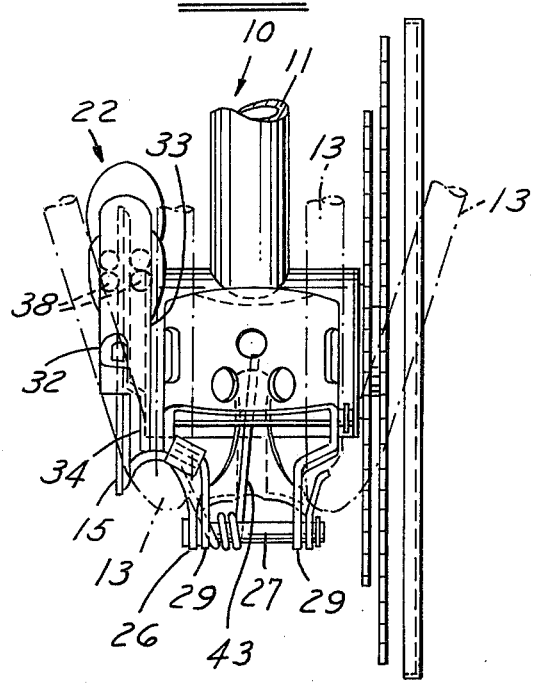
FIG. 5 is a fragmentary view taken along the line 5—5 in FIG. 2.
Figure 7:
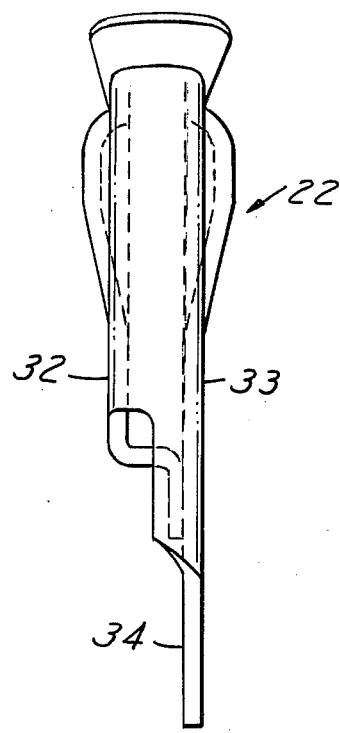
FIG. 7 is an elevational view of the ball clutch arm utilized in the bicycle brake.

Referring more specifically to FIG. 4, the bracket 20 includes spaced portions 23 at the forward end that rest on the frame portions 14 and a tongue 24 that engages a rear frame portion 25 of the frame and is connected thereto by a screw to fix the bracket on the frame. The bracket 20 further includes spaced rearwardly extending vertical portions 26 on which the brake shoe 21 is pivoted by a pin 27 extending through opposed openings in the portions 26.

The brake shoe 21 is made of sheet metal such as high carbon steel and is generally U-shaped in cross section to form spaced walls 28 that have downwardly extending ears 29 through which the pin 27 extends, a connecting arcuate wall 30 which is concave in transverse cross section with respect to the rear tire T on the rear wheel rim R thereby forming a brake surface. The wall 30 includes spaced openings 31 that facilitate the cleaning of the brake surface as well as reduce the weight.

The ball clutch arm 22 is also made of sheet metal such as high carbon steel bent to form spaced walls 32, 33, the latter having a leg 34 which is pivoted by a pin 35 extending through aligned openings 36 in the brake shoe. A spacer 22a properly positions the clutch arm 22.

Figure 6:
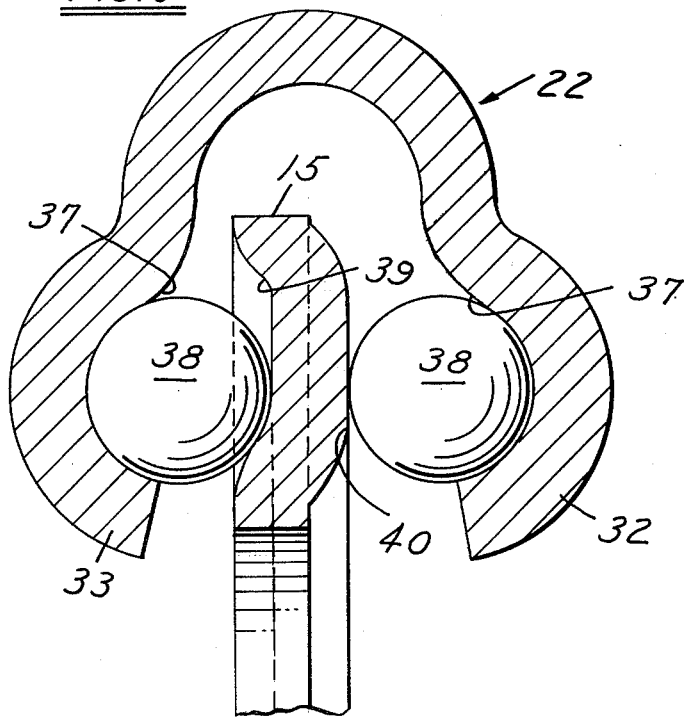
FIG. 6 is a fragmentary sectional view on an enlarged scale taken along the line 6—6 in FIG. 2.
Figure 8:
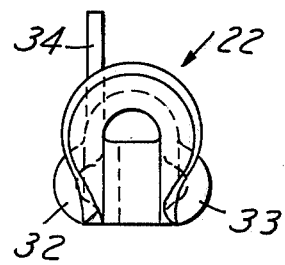
FIG. 8 is an end view of the same.

The spaced walls 32, 33 extend on opposite sides of the disc 15 and each includes a groove 37 that tapers rearwardly of the arm 22 and transversely, that is, the grooves become narrower and shallower in a rearward direction. Pairs of balls 38 are positioned in the grooves such that if the balls move rearwardly, they tend to grip the disc 15 and produce a rearward movement of the ball clutch arm 22 and, in turn, a pivotal action of the brake shoe 21 into engagement with the tire. The disc 15 preferably includes an annular groove 39 of constant cross section into which one pair of balls extends while the opposed surface 40 of the disc is flat (FIG. 6).

A spring 41 has a central portion wound about the pin 27 and one arm 42 extending over one of the frame portions 14 while the other arm is in engagement with the brake shoe as at 43 to urge the brake shoe away from the rear tire.

In use, when the cranks 13 are moved rearwardly, that is when pedaling action is produced, the balls 38 are forced rearwardly toward the shallow ends of the grooves 37 to pivot the ball clutch arm in a direction generally tangentially to the disc and, in turn, pivot the brake shoe bringing the brake surface 30 into engagement with the rear tire.

I claim:

1. In a bicycle comprising a frame having a hub in which pedal cranks are rotatably mounted, a bicycle brake comprising a disc rotatably mounted on said hub for rotation with said crank, a brake shoe pivoted to said frame and extending upwardly along the front of the rear tire of the bicycle and having a surface for engaging the tire upon actuation of the brake, a ball clutch arm pivoted on said shoe and extending upwardly and forwardly toward the periphery of said disc, said arm having opposed walls between which the periphery of the disc extends, said walls having inwardly facing grooves that taper transversely and longitudinally in a rearward direction such that they become narrower and shallower in a rearward direction, a pair of balls in each of said grooves between said disc and the respective wall, and means yieldingly urging said shoe away from said tire such that when the pedal cranks are pedaled rearwardly, said balls travel rearwardly along said grooves to pivot said ball clutch arm and, in turn, the brake shoe bringing the brake shoe surface into frictional contact with the surface of the rear tire.

2. The bicycle brake set forth in claim 1 wherein said frame includes spaced portions extending rearwardly from the hub, a crank housing bracket mounted on said spaced portions, said brake shoe being pivoted to said bracket.

3. The bicycle brake set forth in claim 2 wherein said means yieldingly urging said brake shoe away from said rear tire comprises a spring mounted on said bracket and having spaced arms, one of which engages said frame and the other of which engages said brake shoe.

4. The bicycle brake set forth in claim 1 wherein said brake shoe has a concave arcuate cross section transversely of the tire.

5. The bicycle brake set forth in claim 4 wherein said brake shoe surface includes spaced openings therein.

6. The bicycle brake set forth in claim 1 wherein said brake shoe and ball clutch arm are made of high carbon steel.

7. The bicycle brake set forth in claim 1 wherein said disc comprises an annular groove in one surface thereof into which one pair of balls extends.

8. The bicycle brake set forth in claim 7 wherein the opposite wall of said disc is flat in the area opposite said groove and said disc.

9. In a bicycle comprising a frame having a hub in which pedal cranks are rotatably mounted, a bicycle brake comprising, a disc rotatably mounted on said hub for rotation with said crank, a sheet metal brake shoe pivoted to said frame and extending upwardly along the front of the rear tire of the bicycle and having a surface for engaging the tire upon actuation of the brake, a sheet metal ball clutch arm pivoted on said shoe and extending upwardly and forwardly toward the periphery of said disc, said arm being generally U-shaped in cross section and having opposed walls between which the periphery of the disc extends, said walls having inwardly facing grooves that taper transversely and longitudinally in a rearward direction, a pair of balls in each of said grooves between said disc and the respective wall, and means yieldingly urging said shoe away from said tire such that when the pedal cranks are pedaled rearwardly, said balls travel rearwardly along said grooves to pivot said ball clutch arm and, in turn, the brake shoe bringing the brake shoe surface into frictional contact with the surface of the rear tire.

10. The bicycle brake set forth in claim 9 wherein said brake shoe comprises spaced walls and an intermediate concave arcuate cross sectional transverse wall.

11. The bicycle brake set forth in claim 10 wherein said brake shoe surface includes spaced openings therein.

12. The bicycle brake set forth in claim 11 wherein said disc comprises an annular groove in one surface thereof into which one pair of balls extends.

13. The bicycle brake set forth in claim 12 wherein the opposite wall of said disc is flat in the area opposite said groove and said disc.

14. The bicycle set forth in claim 11 wherein said brake shoe and ball clutch arm are made of high carbon steel.

15. The bicycle brake set forth in claim 9 wherein said frame includes spaced portions extending rearwardly from the hub, a sheet metal crank housing bracket mounted on said spaced portions, said brake shoe being pivoted to said bracket.

16. The bicycle brake set forth in claim 15 wherein said means yieldingly urging said brake shoe away from said rear tire comprises a spring mounted on said bracket and having spaced arms, one of which engages said frame and the other of which engages said brake shoe.

* * * * *